March 14, 1961 M. CAMRAS 2,975,241

MEANS FOR COUNTERACTING SHUNT RELUCTANCE OF A TRANSDUCER HEAD GAP

Filed Dec. 12, 1956 2 Sheets-Sheet 1

Inventor
MARVIN CAMRAS by Hill, Sherman, Meroni, Gross & Simpson Attys.

Inventor
MARVIN CAMRAS
by Hill Sherman Meroni, Gross & Simpson Attys.

2,975,241

MEANS FOR COUNTERACTING SHUNT RELUCTANCE OF A TRANSDUCER HEAD GAP

Marvin Camras, Glencoe, Ill., assignor to Armour Research Foundation of Illinois Institute of Technology, Chicago, Ill., a corporation of Illinois Filed Dec. 12, 1956, Ser. No. 627,919

28 Claims. (Cl. 179—100.2)

This invention relates to a novel transducer head and system and to a novel method of magnetic recording and reproduction.

It is found that attempts to increase the resolution of a record or playback head by using a shorter gap causes serious problems because the useful flux is shunted across the decreased reluctance of a shorter gap. On playback, this results in reduced output and correspondingly poorer signal-to-noise ratio. In recording, more power must be fed to the head for a given recording flux and a point is soon reached where the core of the head saturates before adequate flux is obtained at the gap, especially at bias frequencies. Under these conditions it is found that operating bias cannot be reached, regardless of how much current is used.

It is therefore an important object of the present invention to provide a novel head, system and method for counteracting or cancelling the shunt reluctance of the working gap of a transducing head.

A further object of the invention is to provide a novel transducer head, system and method operative to alter the effective impedance of transducer heads and/or their magnetic loading or demagnetizing action on magnetic record tapes.

A still further object of the invention is to provide a magnetic head wherein the permeability of air or other material which surrounds the head in effect is reduced to zero (or nearly so), and wherein the signal flux is confined solely to its intended path in the head.

Another object of the invention is to provide a magnetic head having the regions surrounding the core of the head maintained at magnetic potentials such as to reduce, counteract or eliminate leakage flux not contributing to the output signal from the head.

Other objects, features and advantages of the present invention will be more fully apparent from the following detailed description taken in connection with the accompanying drawings, in which.

As shown on the drawings.

Figures 1, 2:
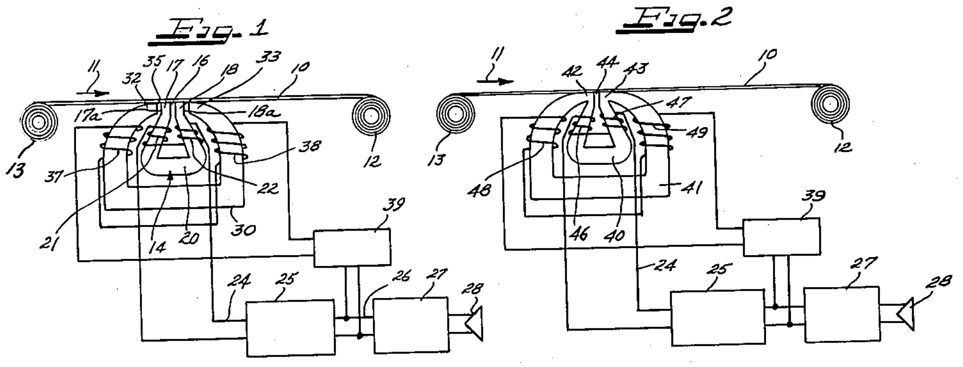
Figure 1 is a diagrammatic illustration of a magnetic playback system in accordance with the present invention.
Figures 2 and 3 illustrate modified core constructions.

In Figure 1 there is illustrated a transducing system in accordance with the present invention wherein a magnetized tape record medium 10 is moved in the direction of the arrow 11 at constant speed by means of a suitable tape transport and guiding means comprising a take-up spool 12 and supply spool 13. A magnetic pickup head 14 is illustrated as having a main gap 16 defined by a pair of confronting pole portions 17 and 18 across which the magnetized tape 10 successively travels. As is well known, the magnetic fields recorded on the tape thread magnetic core 20 of the head and a voltage will be induced in the pickup windings 21 and 22 proportional to the rate of change of the signal flux linking the windings. The windings 21 and 22 are connected so as to produce aiding voltages with respect to the input circuit 24 of the amplifier 25. Thus an amplified signal voltage will be produced in the output circuit 26 of the amplifier 25 for driving a suitable power amplifier and equalizer 27 and output device such as a loud-speaker 28.

If it is attempted to increase the resolution of the playback head by using a gap 16 between the confronting poles 17 and 18 which is shorter in the direction of travel of the record medium, it is found that useful flux from the recorded signal on the record medium 10 tends to be shunted across the gap 16 rather than threading through the core 20 to induce a useful voltage in the pickup windings 21 and 22. The result is reduced output and correspondingly poorer signal-to-noise ratio.

In order to obtain the increased resolution afforded by a shorter gap 16 while maintaining a satisfactory signal-to-noise ratio, it has been found that a secondary flux may be created in the region of the gap 16 for counteracting the effect of the shorter working gap 16. If the secondary flux is of a magnitude to compensate for the flux shunted across the pickup gap 16 and of a phase to aid the primary signal flux across gap 16, we would produce an induced voltage in the windings 21 and 22 of the same magnitude substantially as would be obtained for a gap designed for maximum output. The magnetic circuit of the pickup head is so arranged that this secondary flux links the pickup magnetic circuit so as to increase the output voltage therefrom in accordance with the signal flux on the tape. The secondary flux is preferably a function of the signal flux from the record medium so as to avoid distortion of the signal voltage produced in the pickup coils of the head.

In the embodiment of Figure 1, the secondary flux is produced by means of a core 30 having pole portions 32 and 33 defining a gap 35. The pole portions 17 and 18 extend into the gap 35, and in the illustrated embodiment the tape travels successively across the surfaces of poles 32, 17, 18 and 33. The secondary flux in the illustrated embodiment may be produced by means of windings 37 and 38 linking the core 30 and connected to the output circuit 26 of the amplifier 25 through a suitable phase shifting or integrating network 39 which is effective to adjust the secondary flux to be in phase with the signal flux from the record medium and in aiding relation thereto so as to effectively increase the signal flux linking the pickup windings 21 and 22 in accordance with the signal recorded on the tape 10.

In recording with the head of Figure 1, the windings 21 and 22, and 37 and 38 receive the signal to be recorded directly from the output of a suitable amplifier without any phase shift. The windings 37 and 38 on core 30 are energized so as to produce a secondary flux which aids the main recording flux at gap 16 produced by core 20 and windings 21 and 22. In effect, the core 30 and windings 37 and 38 supply the external leakage flux that would otherwise be carried by core 20, and thus relieve core 20 of that burden. Since core 30 is always energized by an amplifier capable of supplying adequate power, the material of core 30 may be an alloy which, for example, can carry relatively high flux densities, while core 20 may be of a different alloy, for example one which has extremely high initial permeability, but having a lesser flux capacity than the core 30.

Figure 2 illustrates a modified construction comprising a pair of ring type core portions 40 and 41 having common pole portions 42 and 43 defining a pickup gap 44. The pickup windings 46 and 47 are coupled to the amplifier 25 and the windings 48 and 49 on the core portion 41 are connected to the output of the amplifier 25 in order to produce a secondary flux in core 40 in phase with and in aiding relation to the signal flux from the tape as in the embodiment of Figure 1.

It will be noted that in Figure 1, on playback, the windings 37 and 38 may be energized so that secondary pole 32 assumes substantially the same magnetic potential as main pole 17, and so that secondary pole 33 will have substantially the same magnetic potential as main pole 18. We may thus join the cores 20 and 30 between poles 17 and 32 and between poles 18 and 33 to obtain a structure similar to that obtained in Figure 2, without substantially changing the flux distribution as compared to that for the head of Figure 1.

Figures 9, 11, 13:
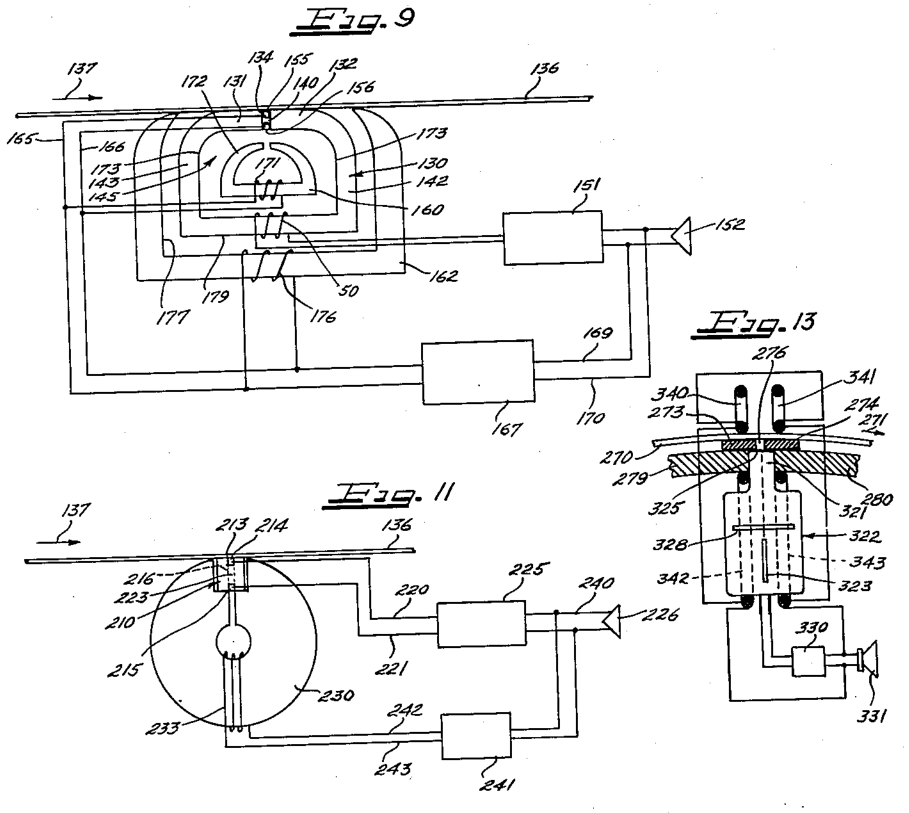

Similarly surfaces of equal potential in Figures 9 and 11 may be joined in the manner illustrated in Figure 2, since joining equipotential surfaces will not change the flux distribution.

Figures 3, 4:
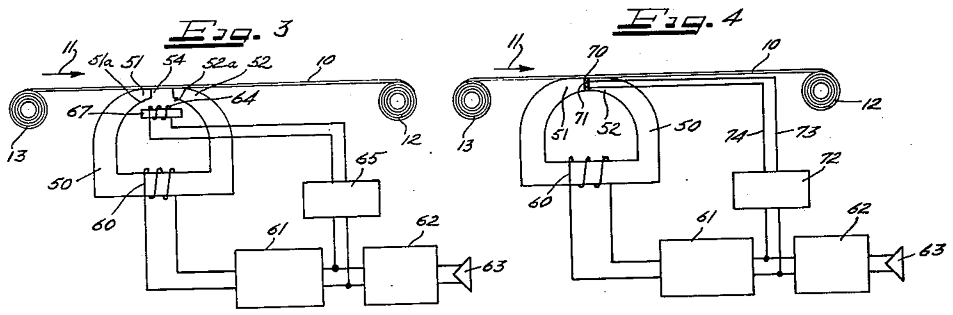
Figures 4 and 5 illustrate a further playback system in accordance with the present invention.

In the embodiment of Figure 3 a loop magnetic core 50 has pole portions 51 and 52 across which the record medium 10 successively travels, and the pole portions 51 and 52 may define a relatively fine gap 54 for coupling of the core 50 to the signal flux recorded on the tape 10. A pickup winding 60 is coupled to the core 50 and connected to a suitable amplifier 61 for driving a suitable power amplifier and equalizer 62 and output device such as a loudspeaker 63. For introducing a secondary flux in phase with the signal flux recorded on the tape and in aiding relation thereto, the output of the amplifier 61 is connected with a winding 64 through a suitable phase adjusting network 65 for producing a secondary flux in the vicinity of the gap 54. The winding 64 may have an air core or may have a suitable magnetic core such as indicated at 67 which may be made of a ferrite material. Ideally the inner magnet 67 would be contoured so that it would conform to the contour of the adjacent inner surface of the magnet 50, and it would be excited so that points on 67 would assume the same magnetic potential as neighboring points on 50. Thus the actual flux that ordinarily passed between legs 51 and 52 would be supplied by magnet 67. In practice a simpler shape such as indicated by 67 is adequate for many purposes.

Figure 5:
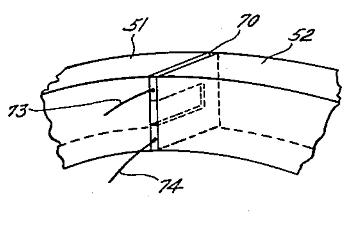

In Figure 4, the pickup core and associated circuitry are the same as in Figure 3 and corresponding reference numerals have been given to corresponding parts. However, in this embodiment, as best seen in Figure 5 an electrically conductive shim member 70 is disposed in the non-magnetic gap between pole portions 51 and 52 and is energized by means of a suitable phase shifting network 72 and conductors 73 and 74 connected to the opposite ends of the shim for establishing a current flow through the shim transverse to the direction of travel of the record tape to establish a secondary magnetic field in accordance with the output from the amplifier 61. The current flow through the shim 70 is in a direction to create a secondary magnetic field which opposes the signal flux that would otherwise cross the gap at 71.

The arrangements of Figures 1 and 2 directly counteract the leakage flux from the outer surfaces of the head such as surfaces 17a and 18a of poles 17 and 18 in Figure 1. To counteract leakage between the inner surfaces of a head such as surfaces 51a and 52a in Figure 3, the arrangement of Figure 3 is desirable. To counteract leakage across the gap of a head, the arrangement of Figure 4 may be used.

Figure 6:
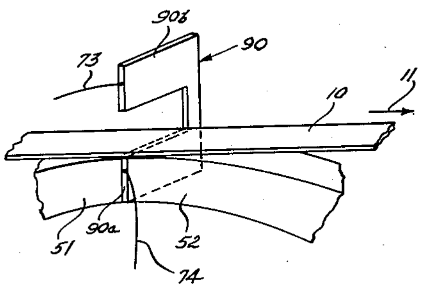
Figures 6 and 7 illustrate modified core construction for use in the system of Figure 4.

Figure 6 illustrates a further modification wherein a shim 90 has a first leg 90a extending between the pole portions 51 and 52 and a second leg 90b extending above the path of the tape 10. As in the embodiment of Figure 4, current is caused to flow by means of conductors 73 and 74 in such a direction in the leg 90a as to produce a secondary field which opposes signal flux across the upper part of the gap at 90a, thus reducing the shunt effect of the upper part of the gap and of the region between 51 and 52 above the pole pieces and allowing the signal flux of the tape to pass readily along pole portions 51 and 52 to link the signal pickup means.

In the head of Figure 6, it is also advantageous to connect the conductors 73 and 74 to the input of the amplifier 61 through a suitable transformer and to connect the output of phase shift network 72 to the winding 60. Similarly conductor loop 90 of Figure 6 could be used in the gaps 16, 44 or 54 of Figures 1, 2 or 3 for developing the input to amplifier 25 or 61 in Figures 1, 2 or 3, while the output of the phase shifter 39 or 65 would then be connected to windings 21 and 22 and/or 37 and 38 in Figure 1, windings 46 and 47 and/or 48 and 49 in Figure 2, or winding 60 and/or 64 in Figure 3.

Figure 7:
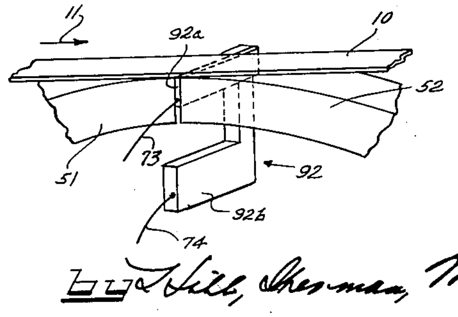

In the embodiment of Figure 7, a shim 92 has an upper leg portion 92a disposed between the pole portions 51 and 52 and a lower leg 92b extending within the loop of core 50 rather than above the tape as in Figure 6. As in the embodiment of Figure 4, current is caused to flow by means of conductors 73 and 74 in such a direction as to produce a secondary magnetic field across the pole-pieces to prevent shunting or leakage of signal flux across the lower part of the gap, and between poles 51 and 52 below the gap.

Figure 8:
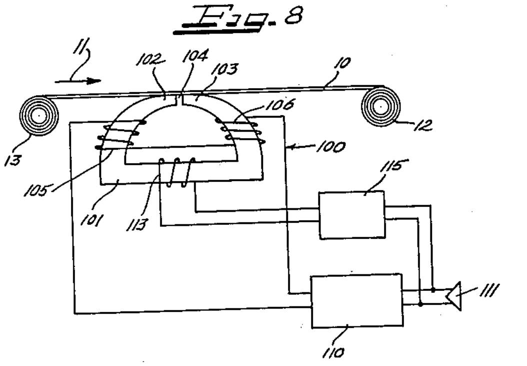
Figures 8 to 13 illustrate further modified playback systems in accordance with the present invention.

In Figure 8, there is illustrated a pickup head 100 comprising a loop magnetic core 101 having pole portions 102 and 103 defining a gap 104 for coupling the core to a magnetized record tape 10 travelling successively across the pole portions 102 and 103. Pickup windings 105 and 106 link the core 101 and are operative to produce an electrical signal in accordance with the rate of change of signal flux threading the core 101. The electrical signal is amplified by means of an amplifier 110 to drive a suitable output device such as loudspeaker 111. In this embodiment, a secondary flux is produced by means of a winding 113 linking the core 101 which is energized from the output of the amplifier 110 through a suitable phase adjusting device 115 so as to produce a secondary flux in aiding relation to the signal flux linking the core 101 at each instant of time in order to overcome the shunting and leakage effects of various parts of the magnetic circuit as noted before, and in order to counteract the loading effect of the head core on the record tape.

It will be understood that in the embodiments of Figures 1 to 7 as well as the embodiment of Figure 8, a secondary flux may be produced which neutralizes the loading effect of the playback head on the tape. Such a loading effect has been found to cause demagnetization and distortion of the recorded signal. In the embodiments of Figures 4 to 7, the secondary flux serves to counteract the leakage inductance of the head and cancel the leakage fields resulting from a relatively fine gap as well as cancelling the shunting effect of the contacting surfaces of the pole portions across which the tape travels, usually with the tape in contact with the pole surfaces. We can think of this as an artificial way of reducing to zero (or nearly so) the permeability of the air or (other material) which surrounds the head, and confining the signal solely along the intended paths.

Since both the signal and the feedback are vectors in a complex plane, their relative magnitude and phase relationships are not ideal at all frequencies, but must be adjusted for the frequency spectrum desired. Over and under compensation as well as compromises will be used in most practical cases.

Figure 9 illustrates a system for effectively neutralizing or preventing leakage flux from a main pick-up core 130. As previously, the core 130 has a pair of confronting pole portions 131 and 132 defining a non-magnetic gap 134 for coupling of the core to a magnetized record medium 136 which is transported by suitable drive and guiding means as in the previous embodiments to move successively across the poles 131 and 132 in the direction of arrow 137. As a magnetized portion of the tape 136 travels across the gap 134 it induces a magnetomotive force which causes a magnetic potential difference between various areas on core 130. This normally produces leakage flux between the pole portions 131 and 132 in the region indicated by the reference numeral 140 and also produces leakage between side leg portions 142 and 143 of core 130 threading the window indicated at 145. A leakage field is also normally produced externally of the core 130 between the external surfaces of the side legs 142 and 143. As in the previous embodiments, a pickup coil 150 links the core 130 and is connected to a suitable amplifier 151 for driving an output device such as a loudspeaker 152.

For substantially eliminating or neutralizing leakage flux resulting from the magnetized record tape, a U-shaped conductor having legs 155 and 156 is inserted in the gap 134 in a manner similar to that illustrated in Figure 5; a second core 160 is placed within the window area 145 and a third core 162 is disposed in surrounding relation to the main core 130. The loop conductor 155, 156 receives current by means of conductors 165 and 166 from integrator 167 connected by conductors 169 and 170 to the output of the amplifier 151. The current flow is in such a direction as to effectively prevent or neutralize leakage flux in the region 140 so as to increase the signal flux threading the pickup coil 150. Similarly, the inner core 160 is driven by means of a winding 171 so as to maintain its external surfaces indicated generally by the reference numeral 172 at substantially the same magnetic potential as the inner surfaces such as indicated at 173 of the core 130 to thereby eliminate or neutralize leakage flux between the side legs 142 and 143 and increase the signal flux threading the coil 150. Similarly, the outer core 162 is energized by means of a coil 176 so as to maintain its inner surface indicated at 177 at substantially the same magnetic potential as the external surface 179 of the main core 130 whereby leakage flux between external surfaces of the core 130 is eliminated or neutralized to increase the signal flux linking the coil 150. The integrator or phase shifter 167 adjusts the phase of the current fed to the windings 155—156, 171 and 176 so as to effectively eliminate leakage flux. Suitable means may, of course, be provided for adjusting the current flow to the respective windings individually, and for adjusting their respective phases for optimum output voltage at the winding 150.

Figure 10:
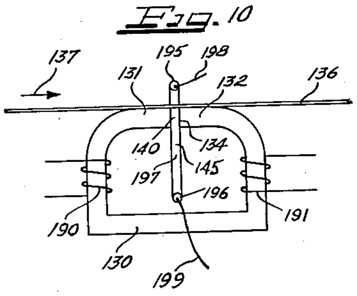

Figure 10 illustrates a modification of the system of Figure 9 wherein the main core 130 and record member 136 are the same as in Figure 9. Windings 190 and 191 linking the core 130 in aiding relationship are connected to a suitable amplifier and output device as in the previous embodiment. The U-shaped conductor or winding having side legs 195 and 196 and joining portion 197 are connected by means of conductors 198 and 199 to the output of the amplifier through a suitable phase shifter network in the same manner as illustrated in Figure 9. In this case, the conductor or winding portions 195 and 196 are so disposed as to neutralize or prevent leakage flux across the gap area 140, across the window area 145, and also across the area above the polepieces.

With the heads shown in Figures 3, 4, 9 and 10 particularly, but also to some extent with the heads of Figures 1 and 2, we can supply shunt or leakage flux to the main gap of the head by an auxiliary means (for example by core 30 and windings 37 and 38 in Figure 1, core 41 and windings 48 and 49 in Figure 2, core 67 and winding 64 in Figure 3, and conductor loop 70 in Figure 4), and thus take advantage of the benefits of a shorter main gap while avoiding the disadvantage of the increased shunting effect which accompanies a shorter gap. In effect the reluctance of a main gap is increased by the auxiliary means of the present invention beyond the quiescent value of reluctance determined by the dimensions of the gap.

Figure 12:
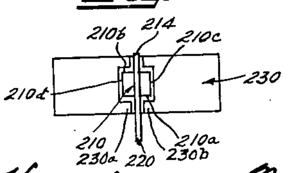

Figures 11 and 12 illustrated a further modified form of the present invention wherein the pickup core comprises a generally H-shaped shim 210 defining a non-magnetic gap 213 and having a U-shaped pickup loop with legs 214, 215 connected in series by a portion 216 for producing a voltage between the conductors 220 and 221 when signal flux is set up by the tape 136 in the portion 223 of the shim 210. The conductors 220 and 221 may be connected through a transformer to a suitable amplifier device 225 for driving a suitable output such as loudspeaker 226. As in the previous embodiments, an auxiliary core 230 may surround the external surfaces such as 210*a*, 210*b*, 210*c* and 210*d*, Figure 12, and may be maintained by means of a coil 233 at substantially the same magnetic potential as the external surfaces of the shim 210 to prevent leakage flux between the external surfaces of the shim and thereby maximize the signal flux linking the shim portion 223. The winding 233 may be energized from the output circuit 240 of amplifier 225 through a suitable phase shifter 241 and conductors 242 and 243 shown in Figure 11. The proportions of 210 are exaggerated for illustration. The actual thickness of the gap 213 may be in the order of microns, and the shim 210 of comparable dimensions. Figure 12 is a top plan view of the structure of Figure 11 to illustrate the manner in which the core 230 of Figure 11 may be provided with flanges such as 230*a* and *b* extending along the side surfaces 210*a* and 210*b* of the magnetic shim 210.

Figure 13 illustrates a flux sensitive head to which my invention is very advantageously applied since no phase shifting network is required. While the invention is applicable to all types of heads which respond directly to magnetic flux, as well as to heads which respond to the rate of change of flux, in Figure 13 an electron beam type flux sensitive head is illustrated which is identical to the head shown in Figures 42 and 43 of my copending application Serial No. 411,608, filed February 23, 1954, the same reference numerals being utilized for convenience of comparison. The disclosure of said copending application is incorporated herein by reference, and the present invention is applicable to all the embodiments of Serial No. 411,608.

In the electron cloud head 322 of Figure 13, a beam of electrons is established by an electron gun structure 323 and is directed into a very thin capillary portion 321 which may have approximately the width of the tape 270. The beam is reflected from the capillary portion 321 by means of a surface 325 at the end of the capillary which may be maintained at cathode potential or slightly negative with respect to the cathode. The surface 325 may be provided by an aquadag coating on the wall of the capillary portion 321, or the capillary wall itself may be maintained at cathode potential under suitable conditions. The capillary section 321 thus constitutes a low velocity region, the reflected electrons traveling from this region at low velocity toward a pair of anode plates such as 328 being very sensitive to the input signal magnetic field developed between the end faces of poles 279 and 280. An input magnetic field causes electron flow to one of the anodes such as 328 to predominate to produce an electric potential between the anodes which is supplied to amplifier 330 for the purpose of driving an output device such as loudspeaker 331.

In Figure 13, the tape record member 270 travels in the direction of arrow 271 successively across pole portions 273 and 274 which define a conventional non-magnetic pickup gap 276 therebetween. The input signal field for electron cloud transducer head 322 is defined by the relatively massive pole pieces 279 and 280 disposed on opposite sides of capillary portion 321 of head 322. Any of the previously described embodiments of the present invention may be utilized in Figure 13 to counteract undesired leakage flux for example, auxiliary magnetic cores may be positioned in relation to pole pieces 273 and 274 or pole pieces 279 and 280 generally in the manner illustrated in Figures 1, 2, 3 (core 67 could be placed laterally of gap 276, for example), 8 and/or 9 or conductor turns as illustrated in Figures 4, 5, 6, 7, 9 and/or 10 could be provided in or adjacent gap 276.

By way of example, windings are indicated at 340, 341, 342 and 343 for counteracting undesired leakage flux. These windings may have a generally rectangular configuration with multiple turns, and the lower horizontal legs of windings 340 and 341 may extend across the entire width of tape 270 and may be energized by current flow in a direction to oppose leakage flux from the pole portions 273 and 274 at gap 276. Similarly, the upper horizontal legs of windings 342 and 343 may extend across the width of the lower surfaces of poles 279 and 280 and be energized by current flow in a direction to oppose leakage flux in the region below poles 279 and 280. The respective windings 340–343 are suitably energized from the output of amplifier 330 with little or no need for a phase shifting network as diagrammatically indicated in Figure 13. Suitable means (not shown) may be provided for individually adjusting the desired polarity and magnitude of the energizing currents for the respective windings 340–343.

In general it will be observed that the direction of current flow in the auxiliary means of Figures 1 to 12 may advantageously be such as to reduce the flux linking the main coil of the head, or in other words to reduce the inductance of the main coil. Reduction of head inductance by the auxiliary means of the present invention (with little or no sacrifice of output voltage) is a great advantage in high frequency work since the self resonant frequency of the head circuit is raised. Further, it will be understood by those skilled in the art that auxiliary fields may be established by the means disclosed herein which will oppose the loading or demagnetizing effect of the head on the tape, and/or reduce, counteract or oppose leakage flux from the head.

In actual constructions of the heads illustrated, the gaps may be of the order of microns and are preferably filled to prevent accumulation of foreign matter therein. The cores are preferably laminated or of ferrite construction. Portions of current carrying shims or conductors not in the gap of the heads such as conductor leg 90*b* in Figure 6, may be of enlarged cross section as indicated by enlarged leg 92*b* in Figure 7 so as to present the lowest possible electrical resistance.

Reference is made to my copending application Serial No. 434,281, filed June 3, 1954 and particularly to the description of Figure 12 of said copending application pursuant to 35 U.S.C. 120.

It will be apparent that many further modifications and variations may be effected without departing from the present invention.

I claim as my invention:

1. A magnetic transducing structure for cooperation with a magnetizable record medium to translate a signal of signal frequency between an electric and a magnetic form comprising a transducer head having a magnetic signal flux path for magnetic signal flux and having an electric signal current path for an electric signal operatively associated therewith, means for coupling the magnetic signal flux path of said head with the magnetizable record medium at a transducing region, means whereby said transducer head is operative to translate a signal between an electric form at said electric signal current path and a magnetic form at said magnetic signal flux path, and auxiliary means operatively associated with said transducer head for producing a signal frequency auxiliary magnetic field varying in accordance with said signal and impinging on said transducer head at a region separate from said transducing region to effectively alter the transducing characteristics of said head.

2. A magnetic transducing structure for cooperation with a magnetizable record medium to translate a signal between an electric and a magnetic form comprising a transducer head having a magnetic signal flux path for magnetic signal flux and having an electric signal current path for an electric signal operatively associated therewith, means for coupling the magnetic signal flux path of said head with the magnetizable record medium, means whereby said transducer head is operative to translate a signal between an electric form at said electric signal current path and a magnetic form at said magnetic signal flux path, and auxiliary means operatively associated with said transducer head for producing an auxiliary magnetic field varying in accordance with said signal and impinging on said transducer head to effectively alter the transducing characteristics of said head, said auxiliary means comprising means for reducing leakage of magnetic signal flux from said magnetic signal flux path.

3. A magnetic transducing structure for cooperation with a magnetizable record medium to translate a signal between an electric and a magnetic form comprising a transducer head having a magnetic signal flux path for magnetic signal flux and having an electric signal current path for an electric signal operatively associated therewith, means for coupling the magnetic signal flux path of said head with the magnetizable record medium, means whereby said transducer head is operative to translate a signal between an electric form at said electric signal current path and a magnetic form at said magnetic signal flux path, and auxiliary means operatively associated with said transducer head for producing an auxiliary magnetic field varying in accordance with said signal and impinging on said transducer head to effectively alter the transducing characteristics of said head, said auxiliary means comprising active means for reducing the permeability of stray flux paths not contributing to the transducing function of said head, and means comprising an auxiliary source of energy substantially independent of the energy of said signal for driving said active means.

4. A magnetic transducing structure for cooperation with a magnetizable record medium to translate a signal between an electric and a magnetic form comprising a transducer head having a magnetic signal flux path for magnetic signal flux and having an electric signal current path for an electric signal operatively associated therewith, means for coupling the magnetic signal flux path of said head with the magnetizable record medium, means whereby said transducer head is operative to translate a signal between an electric form at said electric signal current path and a magnetic form at said magnetic signal flux path, and auxiliary means operatively associated with said transducer head for producing an auxiliary magnetic field varying in accordance with said signal and impinging on said transducer head to effectively alter the transducing characteristics of said head, said auxiliary means comprising active means for supplying leakage fields normally associated with said head but not contributing to the transducing function thereof, and means comprising an auxiliary source of energy substantially independent of the energy of said signal for driving said active means.

5. A magnetic transducing structure for cooperation with a magnetizable record medium to translate a signal of signal frequency between an electric and a magnetic form comprising a transducer head having a magnetic signal flux path for magnetic signal flux and having an electric signal current path for an electric signal operatively associated therewith, means for coupling the magnetic signal flux path of said head with the magnetizable record medium, means whereby said transducer head is operative to translate a signal between an electric form at said electric signal current path and a magnetic form at said magnetic signal flux path, and auxiliary means operatively associated with said transducer head for producing a signal frequency auxiliary magnetic field varying in accordance with said signal and impinging on said transducer head to effectively alter the transducing characteristics of said head, said auxiliary means comprising means for counteracting the demagnetizing action of said transducer head on said magnetizable record medium.

6. A magnetic transducing structure for cooperation with a magnetizable record medium to translate a signal between an electric and a magnetic form comprising a transducer head having a magnetic signal flux path for magnetic signal flux and having an electric signal current path for an electric signal operatively associated therewith, means for coupling the magnetic signal flux path of said head with the magnetizable record medium, means whereby said transducer head is operative to translate a signal between an electric form at said electric signal current path and a magnetic form at said magnetic signal flux path, and auxiliary means operatively associated with said transducer head for producing an auxiliary magnetic field varying in accordance with said signal and impinging on said transducer head to effectively alter the transducing characteristics of said head, said auxiliary means comprising means for reducing the self inductance of said transducer head.

7. A magnetic head structure for cooperation with a magnetizable record medium to translate a signal between a magnetically recorded form on said record medium and an electrical form, comprising magnetic transducer core means having a gap for coupling of the core means to the magnetizable record medium at a transducing region, electric transducer means operatively associated with said magnetic transducer core means for coupling with the portion of a magnetizable record medium at said gap to translate the signal between a magnetically recorded form on the record medium and an electrical form in said electrical transducer means, and auxiliary means operatively associated with said magnetic transducer core means for producing an auxiliary magnetic field in the region of said magnetic transducer core means but spaced from said transducing region and varying with said signal.

8. A magnetic head structure for cooperation with a magnetizable record medium to translate a signal between a magnetically recorded form on said record medium and an electrical form, comprising magnetic transducer core means having a gap for coupling of the core means to the magnetizable record medium, electric transducer means operatively associated with said magnetic transducer core means for coupling with the portion of a magnetizable record medium at said gap to translate the signal between a magnetically recorded form on the record medium and an electrical form in said electrical transducer means, and auxiliary means operatively associated with said magnetic transducer core means for producing an auxiliary magnetic field in the region of said magnetic transducer core means varying with said signal, said auxiliary means comprising auxiliary magnetic core means, and means for producing a magnetic flux in said auxiliary core means varying with said signal and of phase to oppose leakage flux from said magnetic transducer core means.

9. A magnetic head structure comprising a magnetic playback head including magnetic core means having a gap for coupling said core means to a magnetic record medium having a signal recorded thereon, output means responsive to a signal flux from said record medium linking said core means to produce an electrical output signal, and auxiliary means responsive to said electrical output signal for producing an auxiliary magnetic field in the region of said core means varying with the signal recorded on said record medium.

10. A magnetic head structure comprising magnetic core means having a gap for coupling said core means to a magnetic record medium, output means responsive to a signal flux from said record medium linking said core means to produce an output signal, auxiliary means responsive to said electrical output for producing an auxiliary magnetic field in the region of said core means varying with the signal recorded on said record medium, and means whereby said auxiliary field opposes a leakage field from said core means.

11. A magnetic head structure comprising magnetic core means having a gap for coupling said core means to a magnetic record medium, output means responsive to a signal flux from said record medium linking said core means to produce an output signal, auxiliary means responsive to said electrical output for producing an auxiliary magnetic field in the region of said core means varying with the signal recorded on said record medium, and means whereby said auxiliary field aids the field recorded on the record medium to counteract the demagnetizing effect on said record medium of said magnetic core means.

12. A magnetic head structure comprising magnetic core means having means for coupling said core means to a magnetic record medium, output winding means responsive to a signal flux from said record medium linking said core means for producing an electrical output, auxiliary means responsive to said electrical output for producing an auxiliary magnetic field in the region of said core means varying in accordance with the signal recorded on the record medium, and means whereby said auxiliary field acts to reduce the apparent inductance of said output winding means to increase the natural frequency of oscillation of the output circuit associated with said output winding means.

13. A magnetic head structure comprising magnetic core means having a gap for coupling said core means to a magnetic record medium, output means responsive to a signal flux from said record medium linking said core means to produce an output signal, auxiliary means responsive to said electrical output for producing an auxiliary magnetic field in the region of said core means varying with the signal recorded on said record medium, and means whereby said auxiliary magnetic field aids the signal flux linking said output means to increase the electrical output from said output means.

14. A magnetic head structure comprising magnetic core means having means for coupling said core means to a magnetic record medium, output means responsive to a signal field defined by said core means for producing an electrical output, an auxiliary means connected to said output means for energization by a portion of said electrical output and operative to produce an auxiliary magnetic field varying in accordance with the signal magnetic field produced by the record medium, and means whereby said auxiliary field acts to aid the signal field to effectively decrease the loading effect of said core means on said record medium.

15. A magnetic head structure comprising a magnetic playback head including magnetic core means having means for coupling said core means to a magnetic record medium, output means responsive to a signal field defined by said core means for producing an electrical output, an auxiliary means connected to said output means for energization by a portion of said electrical output and operative to produce an auxiliary magnetic field varying in accordance with the signal magnetic field produced by the record medium, and means whereby said auxiliary magnetic field acts to effectively increase the reluctance of said means for coupling said core means to said record medium.

16. A magnetic head structure comprising a magnetic playback head including magnetic transducer core means having a gap for coupling thereof to a magnetic record medium, output means responsive to a signal field defined by said core means and produced by said record medium to produce an electrical output varying in accordance with the signal recorded on said record medium, auxiliary core portions in proximity to surface portions of said magnetic transducer core means, and means connected to said electrical output means for maintaining said auxiliary core portions at substantially the same magnetic potential as the respective adjacent surfaces of said magnetic transducer core means.

17. A magnetic head structure for cooperation with a magnetizable record medium to translate a signal between a magnetically recorded form on said record medium and an electrical form, comprising magnetic transducer core means having a gap for coupling of the core means to the magnetizable record medium, electric transducer means operatively associated with said magnetic transducer core means for coupling with the portion of a magnetizable record medium at said gap to translate the signal between a magnetically recorded form on the record medium and an electrical form in said electrical transducer means, and auxiliary means operatively associated with said magnetic transducer core means for producing an auxiliary magnetic field in the region of said magnetic transducer core means varying with said signal, said auxiliary means comprising means for establishing regions of magnetic potential corresponding to the magnetic potential of surfaces of said magnetic transducer core means to oppose leakage flux from said surfaces of said magnetic transducer core means.

18. A magnetic head structure for cooperation with a magnetizable record medium to translate a signal between a magnetically recorded form on said record medium and an electrical form, comprising magnetic transducer core means having a gap for coupling of the core means to the magnetizable record medium, electric transducer means operatively associated with said magnetic transducer core means for coupling with the portion of a magnetizable record medium at said gap to translate the signal between a magnetically recorded form on the record medium and an electrical form in said electrical transducer means, and auxiliary means operatively associated with said magnetic transducer core means for producing an auxiliary magnetic field in the region of said magnetic transducer core means varying with said signal, said auxiliary means comprising conductor means disposed adjacent said gap, and means for establishing current flow in said conductor means varying with said signal and of phase to establish an auxiliary magnetic field opposing leakage flux from said magnetic transducer core means.

19. A magnetic head structure for cooperation with a magnetizable record medium to translate a signal between a magnetically recorded form on said record medium and an electrical form, comprising magnetic transducer core means having a gap for coupling of the core means to the magnetizable record medium, electric transducer means operatively associated with said magnetic transducer core means for coupling with the portion of a magnetizable record medium at said gap to translate the signal between a magnetically recorded form on the record medium and an electrical form in said electrical transducer means, and auxiliary means operatively associated with said magnetic transducer core means for producing an auxiliary magnetic field in the region of said magnetic transducer core means varying with said signal, said auxiliary means comprising conductor means disposed adjacent said gap, and means for establishing current flow in said conductor means varying with said signal and of phase to establish an auxiliary magnetic field opposing leakage flux from said magnetic transducer core means, said magnetic transducer core means comprising a pair of poles defining said gap, and said conductor means being disposed between said poles to oppose leakage flux between the poles.

20. A magnetic head structure for cooperation with a magnetizable record medium to translate a signal between a magnetically recorded form on said record medium and an electrical form, comprising magnetic transducer core means having a gap for coupling of the core means to the magnetizable record medium, electric transducer means operatively associated with said magnetic transducer core means for coupling with the portion of a magnetizable record medium at said gap to translate the signal between a magnetically recorded form on the record medium and an electrical form in said electrical transducer means, and auxiliary means operatively associated with said magnetic transducer core means for producing an auxiliary magnetic field in the region of said magnetic transducer core means varying with said signal, said auxiliary means comprising conductor means disposed adjacent said gap, and means for establishing current flow in said conductor means varying with said signal and of phase to establish an auxiliary magnetic field opposing leakage flux from said magnetic transducer core means, said magnetic transducer core means comprising a pair of poles defining said gap, said conductor means being disposed between said poles to oppose leakage flux between the poles, and said conductor means having length portions at opposite ends of the space between the poles which carry current in opposite directions.

21. A magnetic head structure for cooperation with a magnetizable record medium to translate a signal between a magnetically recorded form on said record medium and an electrical form, comprising magnetic transducer core means having a gap for coupling of the core means to the magnetizable record medium, electric transducer means operatively associated with said magnetic transducer core means for coupling with the portion of a magnetizable record medium at said gap to translate the signal between a magnetically recorded form on the record medium and an electrical form in said electrical transducer means, and auxiliary means operatively associated with said magnetic transducer core means for producing an auxiliary magnetic field in the region of said magnetic transducer core means varying with said signal, said auxiliary means comprising conductor means disposed adjacent said gap, and means for establishing current flow in said conductor means varying with said signal and of phase to establish an auxiliary magnetic field opposing leakage flux from said magnetic transducer core means, said conductor means having a first length portion at one side of the path of the record medium across said gap, and having a second length portion on the opposite side of said path.

22. A magnetic head structure for cooperation with a magnetically recorded form on said record medium and an electrical form, comprising magnetic transducer core means having a gap for coupling of the core means to magnetizable record medium, electric transducer means operatively associated with said magnetic transducer core means for coupling with the portion of a magnetizable record medium at said gap to translate the signal between a magnetically recorded form on the record medium and an electrical form in said electrical transducer means, and auxiliary means operatively associated with said magnetic transducer core means for producing a signal frequency auxiliary magnetic field in the region of said magnetic transducer core means varying with said signal, said electric transducer means comprising a device threaded by signal flux from the record medium and responsive directly to magnetic flux for producing an electric output from the device varying directly with a signal recorded on said record medium.

23. A magnetic head structure for cooperation with a magnetizable record medium to translate a signal between a magnetically recorded form on said record medium and an electrical form, comprising a magnetic playback head including magnetic transducer core means having a gap for coupling of the core means to magnetizable record medium, electric transducer means operatively associated with said magnetic transducer core means for coupling with the portion of a magnetizable record medium at said gap to translate the signal between a magnetically recorded form on the record medium and an electrical form in said electrical transducer means, and auxiliary means operatively associated with said magnetic transducer core means for producing an auxiliary magnetic field in the region of said magnetic transducer core means varying with said signal, said electric transducer means comprising a device responsive directly to magnetic flux for producing an electric output varying directly with a signal recorded on said record medium, and means connected to the output of said electric transducer device for energizing said auxiliary means.

24. A magnetic recording structure for cooperation with a magnetizable record medium comprising a recording head having a magnetic signal flux path for magnetic signal flux and having an electric signal current path for an electric signal to be recorded operatively associated therewith, means for coupling the magnetic signal flux path of the head with the magnetizable record medium at a recording region, means whereby said recording head is operative to record a signal introduced in electrical form at said electric signal current path as a magnetically recorded signal on said record medium, and auxiliary means operatively associated with said recording head for producing an auxiliary magnetic field impinging on said recording head at a region separate from said recording region to effectively alter the recording characteristics of said head.

25. A magnetic recording structure for cooperation with a magnetizable record medium comprising a recording head having a magnetic signal flux path for magnetic signal flux and having an electric signal current path for an electric signal to be recorded operatively associated therewith, means for coupling the magnetic signal flux path of the head with the magnetizable record medium, means whereby said recording head is operative to record a signal introduced in electrical form at said electric signal current path as a magnetically recorded signal on said record medium, and auxiliary means operatively associated with said recording head for producing an auxiliary magnetic field impinging on said recording head to effectively alter the recording characteristics of said head, said auxiliary means comprising means for counteracting the shunt reluctance of said means for coupling the magnetic signal flux path of the head with the magnetizable record medium.

26. A magnetic recording structure for cooperation with a magnetizable record medium comprising a recording head having a magnetic signal flux path for magnetic signal flux and having an electric signal current path for an electric signal to be recorded operatively associated therewith, means for coupling the magnetic signal flux path of the head with the magnetizable record medium, means whereby said recording head is operative to record a signal introduced in electrical form at said electric signal current path as a magnetically recorded signal on said record medium, and auxiliary means operatively associated with said recording head for producing an auxiliary magnetic field impinging on said recording head to effectively alter the recording characteristics of said head, said auxiliary means comprising means for supplying magnetic flux to said magnetic signal flux path including a core of different magnetic characteristics than the magnetic material of said magnetic signal flux path.

27. A magnetic recording structure for cooperation with a magnetizable record medium comprising a recording head having a magnetic signal flux path for magnetic signal flux and having an electric signal current path for an electric signal to be recorded operatively associated therewith, means for coupling the magnetic signal flux path of the head with the magnetizable record medium, means whereby said recording head is operative to record a signal introduced in electrical form at said electric signal current path as a magnetically recorded signal on said record medium, and auxiliary means operatively associated with said recording head for producing an auxiliary magnetic field impinging on said recording head to effectively alter the recording characteristics of said head, said magnetic signal flux path being provided by a core of magnetic material and said coupling means comprising a gap in said core, and said auxiliary means comprising an auxiliary core separate from the core providing said magnetic signal flux path.

28. A magnetic transducing structure for cooperation with a magnetizable record medium to translate a signal between an electric and a magnetic form comprising a transducer head having a magnetic signal flux path for magnetic signal flux and having an electric signal current path for an electric signal operatively associated therewith, means for coupling the magnetic signal flux path of the head with the magnetizable record medium, means whereby said transducer head is operative to translate a signal between an electric form at said electric signal current path and a magnetic form at said magnetic signal flux path, said magnetic signal flux path being provided by a core and said coupling means comprising a gap in said core, and auxiliary means operatively associated with said transducer head for producing an auxiliary magnetic field impinging on said transducer head to effectively alter the transducing characteristics of said head, said auxiliary means comprising an auxiliary core separate from the core providing said magnetic signal flux path.

References Cited in the file of this patent

UNITED STATES PATENTS

| | | |
|---|---|---|
| 2,538,405 | Zenner | Jan. 16, 1951 |
| 2,628,286 | Rettinger | Feb. 10, 1953 |
| 2,649,506 | Gayford | Aug. 18, 1953 |
| 2,722,569 | Loper | Nov. 1, 1955 |